United States Patent [19]
Fowler

[11] 4,240,581
[45] Dec. 23, 1980

[54] HEATING SYSTEM AND METHOD UTILIZING RECOVERABLE ENGINE HEAT

[76] Inventor: Joe W. Fowler, Rte. 2, Box 39, Reidsville, N.C. 27320

[21] Appl. No.: 65,459

[22] Filed: Aug. 10, 1979

[51] Int. Cl.³ .............................................. F26B 3/04
[52] U.S. Cl. ............................ 237/12.1; 237/12.3 A; 34/34; 34/35; 34/54; 34/46; 34/86
[58] Field of Search .................... 237/12.1, 12.3 A; 34/35, 86, 48, 54, 34, 46

[56] References Cited

U.S. PATENT DOCUMENTS

| | | | |
|---|---|---|---|
| 1,985,636 | 12/1934 | Foss | 237/12.3 A |
| 2,479,526 | 8/1949 | Touton | 34/221 |
| 3,214,100 | 10/1965 | Aronson et al. | 237/12.1 |

*Primary Examiner*—Larry I. Schwartz
*Attorney, Agent, or Firm*—B. B. Olive

[57] ABSTRACT

A heating system and method are provided in which a defined area to be heated or to be used for drying crop material may be connected through adjustable ducting to either a primary heat source, such as an oil or gas furnace, or to an alternate heat source comprising a shrouded engine, such as an internal combustion or turbine engine, from which heat may be extracted. A control system allows the engine heat source to be automatically activated in the event of an electric power failure or to be selectively used as the sole source or as a supplementary back up source of heat. The control system further allows the automatic activation of the electric system, should the engine system fail, thus cycling from one mode to the other when either is selected as the primary mode.

7 Claims, 2 Drawing Figures

HEATING SYSTEM AND METHOD UTILIZING RECOVERABLE ENGINE HEAT

BACKGROUND OF THE INVENTION

1. Field of the Invention:

The invention is directed to apparatus and methods for heating spaces or curing crops and more specifically to heating and curing systems adapted to utilize engine heat as a heat source.

2. Description of the Prior Art:

Apparatus and methods for curing or drying of crops by circulation of pressurized air through a defined area or space have been documented in numerous prior patents. U.S. Pat. Nos. 3,105,713; 3,910,757; 3,972,674 and 3,999,303 are cited by way of example. U.S. Pat. Nos. 4,050,163; 4,003,139; 3,965,696 and 3,931,683 provides apparatus and methods for drying agricultural and other products and teach various means for maximizing the extraction of heat from heat sources.

Of particular interest to the present invention, reference is made to U.S. Pat. Nos. 2,343,346 and 2,479,526 which teach utilization of heat given off by a tractor engine for curing purposes in a barn.

The present applicant through Carolina Thermal Company of Reidsville, N.C., has sold a so-called "NR Power System" for barns equipped with a conventional furnace. This system utilized an LP gas engine as a heat source and to drive the fan but without the automatic control features of the present invention. Provision was made for an electric motor to drive the fan on engine failure. The NR system was withdrawn because of operational and mechanical problems and the need for an automatic control system which would allow automatic switching from one heat source mode to the other and vice versa. Also, the NR system revealed the special need for an automatic damper control.

A background article entitled "On Site Power Generation For C II Facilities" found in *Specifying Engineer*, November 1978, pages 96–101, discusses methods of recovery of heat energy from various sources.

There remains a need for a practical dual fan drive, heat and electrical power system for heating and drying crops. For example, the loss of air circulation in the event of an electrical power failure or failure of a primary heat source is critical in the curing of green leaf crops such as tobacco where a short period of two to four hours without forced airflow through the crop being cured may result in considerable economic loss. Thus, the provision of an improved heating apparatus and method designed to utilize recoverable engine heat, to protect against crop damage in the event of electrical power failures and to use an engine driven generator for loads normally electrically powered to realize energy savings are some of the objectives of the present invention.

SUMMARY OF THE INVENTION

The system and method of the present invention are directed to space heating utilizing either of two sources of heat such as a gas or oil-fired furnace and an alternate source of heat provided by a shrouded engine, such as an internal combustion or turbine engine, a fan arrangement adapted to be powered either by an electric motor or, in the event of an electrical utility power failure, by the engine drive and an associated electrical generator and with means for selectively using either as the primary heat source and electrical source of control and other functions, dependent upon the operator's choice and the availability and operability of either source. Also, sensing and switching means are provided for efficient monitoring and automatically switching from one system of heat and controls to the other and for selectively using either the furnace type heat source or the engine heat source independently or collectively on a controlled schedule.

DESCRIPTION OF THE PREFERRED EMBODIMENT

The system and method of the present invention are broadly applicable to a number of different types of curing chambers or space heaters. The present invention is particularly useful for bulk curing of tobacco but is applicable to curing or drying of other crops. Further, the invention may be used either with a curing barn having a plurality of chambers, for example, as in U.S. Pat. No. 3,105,713 or with a system of separate and isolated heating chambers such as illustrated, for example, in U.S. Pat. No. 3,910,757. The invention system and method may also be applied to either the type of curing barn in which the heated air is directed upwardly as, for example, in U.S. Pat. No. 3,105,713 or downwardly as in U.S. Pat. No. 3,999,303. The system and method of the present invention are also deemed especially useful in conjunction with the system of applicant's copending application Ser. No. 943,242, filed Sept. 18, 1978, entitled "Heat Cycling Apparatus and Method for Bulk Curing Tobacco".

Figure 1:
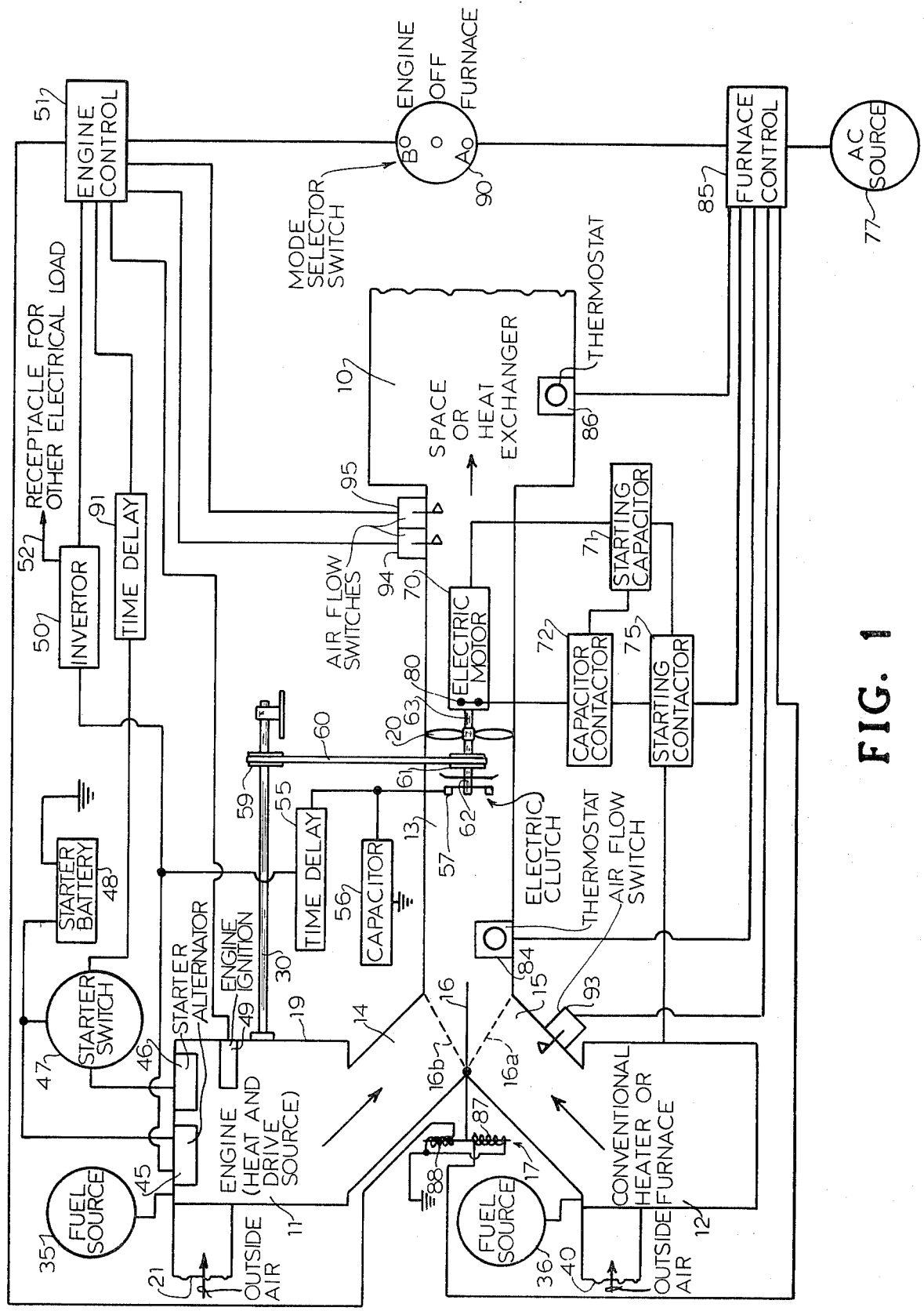
FIG. 1 represents a schematic diagram of a heating system according to the present invention.

As schematically illustrated in FIG. 1, the method and system of the invention are based on heating a selected space 10 from either a suitably shrouded engine 11 or from a conventional furnace heat source 12 or from both simultaneously. The heated air is conducted through a duct system 13 having a branch 14 connected to the engine 11, a branch 15 connected to the furnace heat source 12, a damper 16 controlled by a solenoid 17 and common connector duct 13 enclosing a fan mechanism 20 and connected between the space 10 and the location of damper 16.

Engine 11, as schematically illustrated, is intended to represent an internal combustion engine, a turbine engine, or the like, productive of both heat, electrical and mechanical energy directed to driving an output shaft 30. Thus, when outside air is drawn in through duct 21, around engine 11 and within an appropriate shroud 19, a source of heated air can be drawn through branch duct 14 into connector duct 13 with damper 16 in position 16a and with the fan mechanism 20 in operation. Thus, in this mode, engine 11 becomes both a source of heat and electricity as well as a mechanical drive source utilizing drive shaft 30 to drive the fan mechanism 20 in a manner later explained. Also to be noted here is that engine 11 has its own fuel source 35 which may be the same or may be independent of the fuel source 36 used to supply the conventional furnace heater 12.

Conventional furnace heater 12 is intended to represent a typical source of heat such as gas or oil-fired furnace commonly used in bulk curing barns, residential or commercial buildings, or the like. Thus, in another mode of operation, outside air may be drawn in through duct 40 and heated by conventional heater 12 such that when baffle 16 is in position 16b and the fan mechanism 20 is operating, space 10 may be heated entirely from conventional heater 12 using it as the selected heat source.

In a third mode of operation, it may be noted that baffle 16 may assume the solid line position depicted in the drawing by the action of furnace control 85 as will later be explained and in this mode heat from engine 11 as the selected heat source may be combined with heat obtained from the conventional heater as a supplemental heat source and conveyed through the connector duct 13 to space 10 for accomplishing heating of that space, drying crops therein or other functions requiring the utilization of pressurized heated air. In this way, the system will provide heat in quantity greater than the capacity of either engine 11 or furnace 12 used alone.

Engine 11 is provided with a conventional alternator 45, starter motor 46, starter switch 47 and starter battery 48. Alternator 45 has substantial excess capacity above what is required to maintain starting ability. Alternator 45, thus, serves the purpose of keeping battery 48 charged and through an inverter 50 provides a source of AC power to output receptacle 52 and engine control 51. When operating engine mode, without available electric service, this AC power to the engine control also serves to control 85 to provide AC power to the conventional heater 12 to allow continuation of its operations and other electrical load 52, e.g., lights.

It will also be noted that alternator 45 is connected through an appropriate circuit having a time delay 55 and capacitor 56 to an electric clutch 57 such that when clutch 57 is engaged, drive shaft 30, through pulley 59, belt 60 and pulley 61 may drive the fan shaft 62 to turn fan 20. Time delay 55 provides a means for allowing engine 11 to warm up before adding the load of fan 20 and capacitor 56 operates to convert the output of alternator 45 to an appropriate DC output for operating the DC electric clutch 57 in a manner typical of automotive air conditioning systems.

As further illustrated in the drawing, it will be noted that an electric motor 70 is also connected to shaft 63 for driving fan 20. Thus, fan 20 can be driven either from the engine 11, with clutch 57 engaged or from electric motor 70 with clutch 57 disengaged. Electric motor 70 is represented as being a capacitor start type electric motor having a starting capacitor 71 controlled by a capacitor contactor 72 connected to a motor starting overload contactor 75. The capacitor contactor 72, when operative, acts to remove the starting capacitor 71 from the motor circuit in the absence of available AC power from an outside AC source 77. Electric motor 70 is also equipped with a centrifugal switch 80 which also acts to disengage the starting capacitor 71 in a conventional manner after electric motor 70 approaches its normal operating speed when being used as a drive source for fan 20.

The previously-mentioned AC source 77 is connected through an appropriate furnace control 85 which, in turn, is connected to a thermostat 86 within the space 10 and to a solenoid 87 which acts to control the position of damper 16. When de-energized, solenoid 87 causes damper 16 to assume a neutral position such as illustrated by the solid line position of damper 16 in the drawing. When heater 12 alone is functioning damper 16 is in position 16b. When engine 11 along is functioning damper 16 is in position 16a by the action of solenoid 88. When both heat sources are being used, damper 16 assumes a neutral position. On the occasion when engine 11 heat may exceed the space requirements, outside air may be easily shunted from duct 21 to duct 13. However, for simplicity this has not been shown. Control 85 also connects through a mode selector switch 90 designated as having a "Furnace" position, an "Off" position, and an "Engine" position. Mole selector switch 90 thus provides a means for selecting either engine 11 with the supplemental heat of conventional furnace 12 or the convention furnace heater 12 as the primary heat source for heating space 10. A time delay 91 is introduced into the circuitry to prevent premature engine cranking, i.e., starting, due to a momentary outage of the AC source 77.

With the foregoing description in mind, it can be seen that if mode selector switch 90 is in the "Furnace" position, solenoid 87 will be energized in a manner to cause damper 16 to move into position 16b, conventional heater 12 to be energized for normal operation through starting contactor 75, electric motor 70 to be energized through operation of capacitor contactor 72 and starting capacitor 71 so as to operate fan 20 to withdraw the heated air from the conventional heater 12 into the space 10 and with appropriate adjustments made thereafter by means of space thermostat control 86. Top limit thermostat 84 is for safety to prevent overheating. Airflow switch 93 acts through control 85 to disconnect the fuel from source 36 should air flow diminish for any reason below a safe level. Airflow switch 94 will close on lack of airflow thus commencing the engine for alternate service should the electric fan cease for any reason when in the electric mode. Airflow switch 95 will close on lack of airflow to stop the engine 11 by disconnecting the engine ignition 49 and disengaging the clutch 57 due to engine power failure.

Since the operation of solenoids, starting contactors, relays and thermostats arranged in this general type of circuitry are known, it is believed that those skilled in the art will immediately appreciate the manner of using and operating the conventional heater 12 as a primary heat source.

In another mode, it will be assumed that AC source 77 is no longer operative as indicated by the closing of air flow switch 94. In this event, mode selector switch 90 acts to operate engine control 51 such that starter switch 47 is activated after a time delay imposed by time delay 143 and engine 11 is started by means of operation of starter 46. As part of this same sequence, furnace control 85 will be caused to operate solenoid 87 so as to move damper 16 to position 16a thus allowing the extracted heat from engine 11 to be drawn into branch duct 14 and into connector duct 13. Once engine 11 is operating, shaft 30 will, of course, be rotating and after a time delay imposed by time delay 55, clutch 57 will be engaged and fan shaft 62 will be rotated through pulley 59, belt 60 and pulley 61. Also since capacitor contactor 72 will be open, the starting capacitor 71 will be out of circuit and thus electric motor 70 will be effectively free-wheeling without any substantial load on fan shaft 63. Should the thermostat control order more heat than is provided by the engine 11, the conventional furnace 12 will be energized as a supplemental heat source and solenoid 88 will cause damper 16 to assume a neutral or solid line position during the time of operation of furnace 12 thus allowing heat from both sources to be drawn into duct 13.

Figure 2:
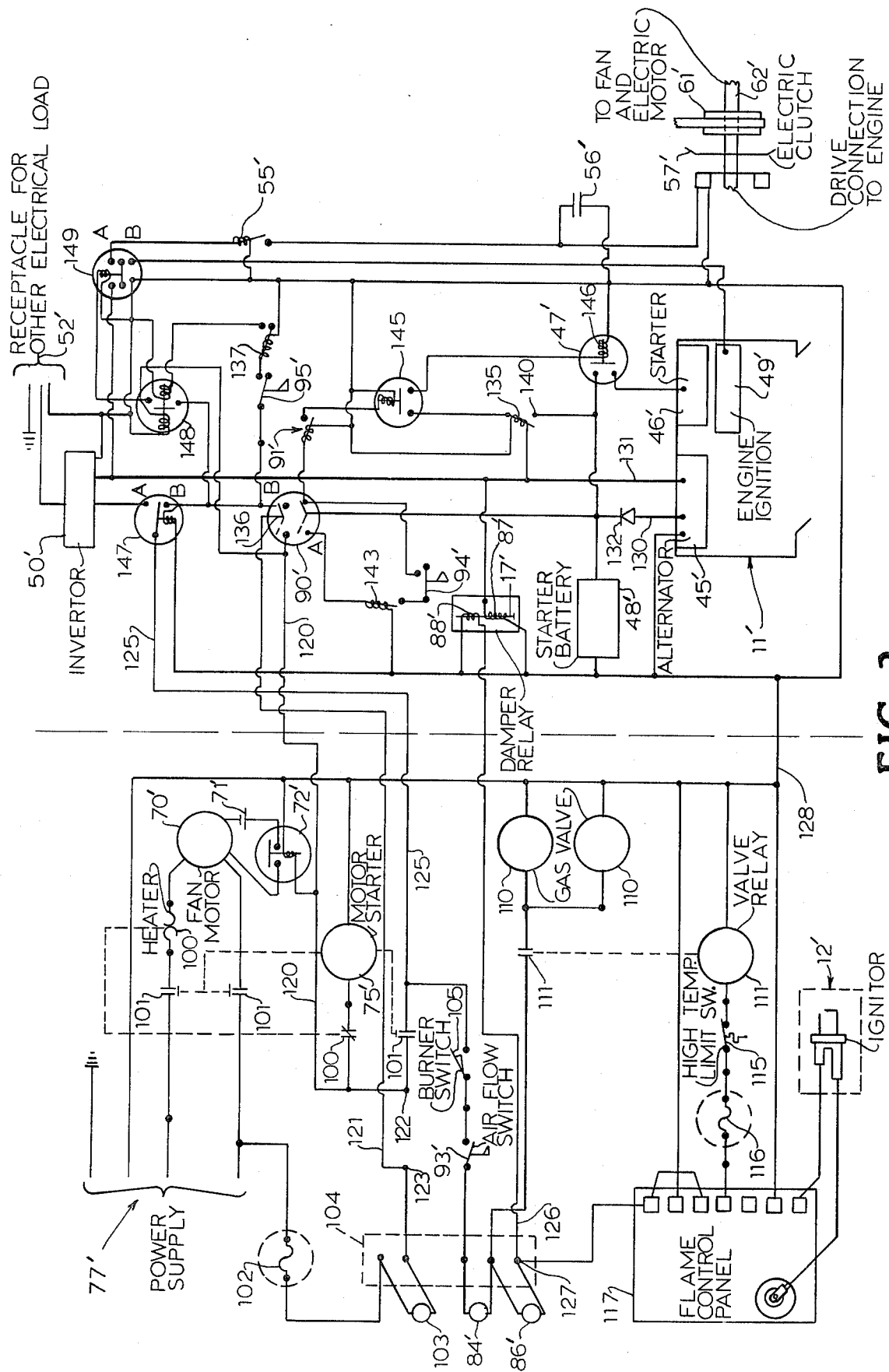
FIG. 2 represents a schematic diagram of the heating system of FIG. 1 embodied with a modified conventional furnace system and more detailed electrical components.

One of the advantages of the circuitry and apparatus of the invention resides in its adaptability to being associated with slightly modified but basically conventional furnace controls. Such furnace controls are widely employed in residential fuel fired furnaces and particularly for drying crops and the like, to which the present invention is especially adapted. FIG. 2 represents to the left side of the drawing, that is, to the left of the central vertical dashed line imposed on the drawing for reference, a modified elementary wiring diagram for a conventional gas-fired furnace control. This particular diagram on the left side of FIG. 2 represents a modification of an elementary diagram published by Aerovent, Inc., of Piqua, Ohio. The circuitry and apparatus indicated on the right side of FIG. 2 represents circuitry and apparatus which has been added as part of the present invention and which operates in conjunction with the conventional furnace control arrangement seen on the left side of FIG. 2.

In order to show the relation between the overall schematic diagram of the invention as shown in FIG. 1 with the circuitry and apparatus of FIG. 2, those components of FIG. 2 which relate directly to components in FIG. 1 are given the same identifying number with a prime sign added. In this regard, furnace ignitor 12' of FIG. 2 is considered as comprising part of the conventional heater 12 of FIG. 1. The electric fan motor 70' of FIG. 2 is also the counterpart of the electric fan motor 70 shown in FIG. 1. Likewise, the electric fan motor starter 75' of FIG. 2 is the counterpart of electric motor starter 75 of FIG. 1.

Since capacitor start motors are widely employed for operating fans in conjunction with furnace systems, a significant contribution of the present invention is that of providing means to remove the starting capacitor of the motor from the circuit when the fan motor is not electrically energized so as to eliminate the motor acting as an alternator being loaded by the starting capacitor when being rotated at speeds below the centrifugal switch 80 cut out point therefore allowing the motor rotor to act somewhat like a flywheel under engine power alone. One modification to the conventional furnace control system indicated on the left side of FIG. 2 is found in the addition of the capacitor contactor 72' which is the counterpart of the capacitor contactor 72 indicated in FIG. 1. The starting capacitor 71' of FIG. 2 is conventionally considered part of the electric motor 70' and is diagrammed separately in FIG. 2 as the counterpart of starting capacitor 71 of FIG. 1.

To continue the comparison of FIGS. 1 and 2, the AC power source 77' of FIG. 2 is a counterpart of AC source 77 of FIG. 1. The conventional high temperature thermostat 84' and control thermostats 86' in FIG. 2 are the counterpart of the thermostat 84 and 86 of FIG. 1. While not illustrated in FIG. 1, the conventional gas-fired furnace control diagram, such as illustrated on the left side of FIG. 2, also conventionally includes overload heater and fusible link 100; electric fan motor starter contacts 101; fuse 102; delay timer 103; terminal block 104, shown in dashed lines; burner switch 105; air flow switch 105; air flow switch 93'; gas solenoid valve 110; valve relay 111; high temperature limit switch 115; fuse 116; and flame control panel 117 with its associated components. Delay timer 103 is optionally required by electrical utilities to prevent accumulated inrush currents on reestablish power to multiple unit installations and further prevents possible cycling from electrical to engine power brought about by intermittant supply of AC source 77'. This delay timer 103 is not required in residential applications. Burner switch 105 allows the manual removal of the furnace 12 heat source to allow total heat from the more efficient engine 11 heat source when this is adequate. The engine 11 heat source is more efficient as the total heat of fuel combustion is contributed to the system as either mechanical, electrical or heat energy, being a co-generating system. The general function of the mentioned components are well understood. Therefore, what is to be emphasized here is that in addition to adding the capacitor contactor 72' to the conventional furnace control circuitry, note should also be made that the conventional single pole fan switch which normally appears between the junctions, designed as junctions 123 and 122 in FIG. 2, has been removed. Also, connecting lines 120 to junction 122, connecting line 121 to junction 123, and connecting line 126 to the control thermostat junction 127 have also been added to the conventional furnace control circuit. The purpose of these added connecting lines, i.e., 120, 121, 125 and 126 will become apparent as the description proceeds. Line 128 provides a common system neutral.

Referring next to the right side of FIG. 2, there is illustrated the circuitry and apparatus which have been added to the modified conventional furnace control as part of the present invention. In FIG. 2, internal combustion engine 11' is the counterpart of the engine heat and drive source 11 of FIG. 1. Alternator 45', engine starter 46', engine battery 48' and inverter 50' represent respectively the counterparts of alternator 45, starter 46, battery 48, and inverter 50 of FIG. 1. Capacitor 56' of FIG. 2 is the counterpart of capacitor 56 of FIG. 1 and, as previously mentioned acts to smooth the output voltage of alternator 45' in FIG. 2 to make possible the operation of the inductive clutch coil load of the electric clutch 57' which is the counterpart of the electric clutch 57 of FIG. 1.

It may also be noted in FIG. 2 that the alternator 45' is shown as having two separate and isolated outputs represented by lines 130 and 131, respectively. Line 130 includes rectifier 132 and is adapted for charging battery 48' whereas line 131 is connected as indicated for control operations including operation of time delay relay 135 and operation of electric clutch 57'. By means of relay 147 which is normally closed on position A, electrical AC power will be provided to the conventional furnace 12 control system if engine 11 is operating and power supply 77' fails. Additional electrical output 52' from alternator 45' in FIG. 2 is indicated by the label "Other Electrical Load". For example, residential electrical loads 52' not requiring shaft power such as required for operating lights and pumps or fans, could be operated off engine 11' of FIG. 2. Thus, the apparatus of the invention provides a means by which the engine cooling and exhaust heat can be employed for residential heating purposes and also as a source for electrical load to be serviced at the same time, as solar pumps, etc.

The following additional relay switch and time delay components are also shown on the right side of FIG. 2. Such relay, time delay and switch components illustrated on the right side of FIG. 2 comprise the following:

Relay Components 145 (Not shown in FIG. 1) 12 volt DC, normally open.

47' Engine Starter Switch (designated 47 in FIG. 1) 12 volt DC, normally open.

147 (not shown in FIG. 1) 120 volt AC-Contact A, normally closed; Contact B, normally open.

148 (Not shown in FIG. 1) 120 volt AC-Normally open.

149 (Not shown in FIG. 1) 120 volt AC-Contact A normally closed; Contact B, normally open.

57' Clutch Relay (Designated 57 in FIG. 1) 12 volt DC, normally open.

Time Delay Components 135 (Not shown in FIG. 1) 12 volt DC, normally closed, 2 second delay.

55' (Designated 55 in FIG. 1) 12 volt DC, normally open, 20 second delay.

137 (Not shown in FIG. 1) 120 volt AC, normally open, 60 second delay.

143 (Not shown in FIG. 1) 120 volt AC, normally open, 10 second delay.

91' (Designated 91 in FIG. 1) 12 volt DC, normally closed, 60 second delay.

Switch Components

90' Mode Selector, Three Position, Double Pole Switch (Designated 90 in FIG. 1, 120 volt AC.

94' Airflow, Single Pole, Single Throw Switch located to sense airflow (Designated 94 in FIG. 1) 12 volt, normally closed.

95' Airflow, Single Pole, Single Throw Switch located to sense airflow (Designated 95 in FIG. 1) 120 volt, normally closed.

As will be apparent from later description, portions of the circuit illustrated on the right side of FIG. 2 correspond to the engine control generally designated as the engine control 51 in FIG. 1 and other components, principally on the left side of FIG. 2, correspond to the control generally designated in FIG. 1 as furnace control 85. That is, FIG. 1 treats the engine control and furnace control functions from a broad, somewhat schematic viewpoint whereas FIG. 2 is intended to represent both the engine control as well as the furnace control functions together with interrelated functions. Both functions will become clear as well as the interrelation between the furnace control and engine control functions as the description proceeds.

Various modes of operation will next be described in reference to FIG. 2. At the outset, it may be noted that in a completely off mode all systems of the invention are inoperative by reason of the mode selector switch 90' being in a neutral position. Assuming that it is desired to utilize the engine heat and drive source 11', the mode selector switch 90' is closed on position B which provides an AC voltage to relay 147 which while normally closed in the indicated position A is, when energized, caused to close on position B which causes an AC voltage to be fed on line 125 to burner switch 105 shown on the left side of FIG. 2. At the same time, a DC voltage from battery 48' is fed through relay 91', normally closed, which causes relay 145, normally open, to close and complete a circuit through relay 135, normally closed, to operate relay 47' to energize starter motor 46'. After the engine starts a time period of 2 seconds imposed by time delay relay 135 which is energized by alternator 45' having developed an output, the starter circuit is opened which stops starter 46'. The time delay relay 91' which controls energization of relay 145 will prevent cranking of starter 46' if engine 11' does not start in a time limit of 60 seconds imposed by time delay relay 91'. As part of this same engine mode of operation, the DC output from alternator 45' is fed through relay 149 to which it is connected through line 131 as illustrated on the right side of FIG. 2 and relay 149 which is normally closed in the indicated position A in turn supplies current to the time delay relay 55' which closes after a predetermined period of time to allow engine warm-up. Closing of time delay relay 55' causes electric clutch relay 57' to be energized and to thereby engage the fan load so as to power the fan mechanically from engine 11' as further schematically illustrated in FIG. 1. In this engine mode the damper relay, designated 87' in FIG. 2, will operate so as to place damper 16 in the position 16a as indicated in FIG. 1. Thus, the space to be heated in this mode can be heated using the engine heat only as a source of heat. If furnace switch 105 is closed to activate the conventional furnace 12 even though electrical source 77 has failed through the action of inverter through relay 149, electric power will be provided to also provide heat from furnace 12 when the thermostats order more heat than is being provided by the engine 11 heat alone.

In another mode which will be referred to as the furnace mode, it will be assumed that it is desired not to operate the engine 11' and to depend on heat from conventional heater 12 indicated in FIG. 1. It will also be assumed that an outside source of electric power, designated 77', is available. For this so-called electric or furnace mode, mode selector switch 90' is placed in the A position and AC voltage is provided on line 120 which, through the heater and overload contact 100, closes the motor starter contactors 101 illustrated on the left side of FIG. 2 and provides power on line 125 by the closing of contacts 101 associated with motor starter 75'. A DC voltage will also be provided to the normally open time delay relay 143 which being open will prevent the completion of the circuit through airflow switch 94 until the speed of electric fan motor 70' has been reached. This action prevents premature cranking of the starter 46' and also in turn causes airflow switch 95' to open and thus the relay 149 is closed in the illustrated position B acting to shut off the engine ignition 49'.

Assume that the above electric mode has been established and the electrical service fails. In this situation, electric motor starter 75 will open, electric fan motor 70 stops and the burner controls and ignition are switched off. In this situation, airflow switch 94' will also close due to a low airflow condition which provides a DC voltage to relay 145 causing the starter 46' to operate. Relay 149 which is normally closed on position A now effectively clears the engine ignition for running and completes a circuit to energize electric clutch 57' after a warm-up period imposed by time delay relay 55'. Thus, what has been illustrated in this failure of electrical service situation is the ability of the invention circuitry and apparatus to respond by substituting the engine heat as a heat source and the engine drive as a mechanical drive source for the electrical source of power.

In another situation, it will be assumed that an engine mode has been established and that the engine fails either because of a mechanical problem or fuel depletion. In this situation, airflow switch 95' senses low airflow and closes to engage after a time delay imposed by time delay relay 137 to prevent cycling. Clutching relay 148 now provides an AC voltage on line 120 and moves relay 149 to its indicated position B to stop engine 11' and disengage electric clutch 57'. The system will maintain this condition as long as the electrical service is provided. However, should the electrical service fail, the system will act to recrank engine 11' and operate it until or unless the airflow switch 95' again indicates a low engine speed and effectively requests electrical source assistance. If, in the interim, the engine has been restored to an operable status and if electrical service is not available, engine 11' will continue to operate even though at a relatively low power output until electric service is restored. This characteristic of the invention system can be readily seen by those skilled in the art from the foregoing description.

In another situation, it will be assumed that there is neither outside electric power available nor is the engine operable because of mechanical problems or fuel depletion. Assuming that engine 11' is operative and for some reason stops at a time when electrical service is also lacking, starter 46' will be caused to crank for a predetermined time, e.g., sixty second, which is imposed by the normally closed time delay relay 91'. Upon expiration of this time, all action will cease until electric service is restored or the system is manually recycled by placing mode selector switch 90' in FIG. 2 in the off position to allow the time delay relay 91' to reset itself. In the interim, should the electrical service resume before the engine mode is reset, the system will operate on the electrical power if mode selector switch 90' is in either the electrical or engine mode position. Further, if the electrical service is again lost after the engine mode is reset by resetting time delay relay 91' by electrical service having been available for the required reset time, starter 46 will be operated for at least sixty seconds and if failing to start will cease cranking however with later restoration of AC sources 77' then will go to the available electrical power. Since those skilled in the art are familiar with the general operation of relays, time delay relays, and switches of the kind illustrated in FIG. 2, it is believed that the foregoing operation will be readily apparent without resort to further detailed description.

In summary then, it can be seen that the invention has provided a very unique system which enables either a conventional furnace to be utilized as a source of heat for heating, for example, a curing barn, residence, or the like, or in the alternative for an internal combustion engine to be used as both heat and drive source. Also, with the unique arrangement of the invention, it can be seen that the fan used to circulate the heated air can be driven either mechanically from the internal combustion engine or from an outside source of electrical power used to operate the conventional furnace control system or from the engine's electrical output source. Also, as previously explained, the invention apparatus and circuitry has the important advantage of being able to automatically switch from one mode of operation to the other mode of operation as, for example, from an engine mode to an electrical mode or from an electrical mode to an engine mode in the event of a failure of either source that has been chosen as the primary source of power. As either mode will provide required life support systems or process heat and the associated distribution power as for fans or pumps that might be needed in such as solar systems in residential applications, the redundancy of the system herein explained is a significant contribution to our security in the time of our developing energy shortages.

The foregoing embodiment is only one specific solution to a typical crop drying application. However, it can be seen that by simple variations in time, linkages and capacities, the system revealed will apply to any other system requiring redundant sources of heat and electricity simultaneously.

What is claimed is:
1. The method of heating a space, comprising:
   (a) establishing a first primary heat source comprising a fuel-fired furnace with electrically-powered control and operational means;
   (b) establishing a second auxiliary heat source comprising an engine productive of recoverable heat and having a mechanically-driven shaft and a suitable shroud enabling the engine heat to be recovered by moving air past the engine through the shroud;
   (c) establishing a duct system connected at one end to a space to be heated and at the other end through duct branches to each of said heat sources and with damper means enabling the space to be selectively connected to such heat sources;
   (d) locating a fan in operative association with said duct system and having one drive connection to an electric motor and another drive connection to said engine shaft and associated with electric control means operable in a first mode to drive said fan with said motor, in a second mode to drive said fan with said engine and with means to automatically sense the failure of operation in one mode and to switch both the source of power and fan connection to the other mode; and
   (e) at least periodically operating in said second mode and heating said space with a source of pressurized air by associating said fan with said shroud and duct associated with said engine to extract the engine heat to provide a source of pressurized heated air for heating said space.

2. The method as claimed in claim 1 of operating said fan on a standby basis with said electric motor connected to drive said fan and at the outset of each such standby operation disconnecting said fan from said engine shaft utilizing control means automatically operable to energize said motor and disconnect said fan from said engine.

3. The method of claim 1 including at least periodically during operation in said second mode and while heating said space with said extracted engine heat of utilizing an electrical power source driven by said engine to electrically power selected electrical apparatus to maintain the functions associated therewith independent of the availability of an external source of power.

4. The method of claim 3 including utilizing said engine driven electrical power source to power said furnace operational means and heating said space both with said extracted engine heat and heat obtained from said furnace.

5. A heating apparatus, comprising:
   (a) structural means establishing an enclosed space to be heated with means for air to enter and exit therefrom;
   (b) a first primary heat source comprising a fuel-fired furnace with electrically powered control and operational means;

(c) a second auxiliary heat source comprising an engine productive of recoverable heat, having a mechanically driven shaft and enclosed with a suitable shroud having means for air entry and exit enabling heat to be recovered by moving air through the shroud past the engine;
(d) a duct system connected at one end to said space to be heated and at the other end through duct branches to each of said heat sources and having damper means enabling said space to be selectively connected to such heat sources; and
(e) fan means operatively associated with said duct system and having one drive connection to an electric motor, another drive connection to said engine shaft and electric control means operable in a first mode to connect said furnace control and operational means and said motor to an external source of power and drive said fan with said motor, in a second mode to drive said fan with said engine and with means to automatically sense the failure of operation in one mode and to switch both the source of power and fan connection to the other mode.

6. A heating apparatus as claimed in claim 6 including
(a) an electrical generator driven by said engine; and
(b) means governed by said control means enabling the output of said generator to be connected to said furnace control and operational means to electrically power the same during operation of said engine and said damper means to be set whereby said space may be heated with heat supplied partially by said engine and partially by said furnace.

7. A heating apparatus as claimed in claim 6 including means enabling the output of said generator to also be connected to external electrically powered apparatus to maintain the function associated therewith independent of the availability of a line source of power.

* * * * *

UNITED STATES PATENT AND TRADEMARK OFFICE
CERTIFICATE OF CORRECTION

PATENT NO. : 4,240,581
DATED : December 23, 1980
INVENTOR(S) : Joe W. Fowler

It is certified that error appears in the above—identified patent and that said Letters Patent is hereby corrected as shown below:

Col. 1, line 17, "provides" should be --provide--.

Col. 4, line 1, "along" should be --alone--.

Col. 4, line 10, "Mole" should be --Mold--.

Col. 4, line 13, "convention" should be --conventional--.

Col. 5, lines 62-63, "air flow switch 105;" should be deleted.

Col. 5, line 63, "valve" should be --valves--.

Col. 12, line 5, "claim 6" should be --claim 5--.

Signed and Sealed this

Twenty-fifth Day of August 1981

[SEAL]

Attest:

GERALD J. MOSSINGHOFF

Attesting Officer

Commissioner of Patents and Trademarks